United States Patent [19]

Hara et al.

[11] Patent Number: 4,945,295
[45] Date of Patent: Jul. 31, 1990

[54] OPERATION CONFIRMATORY CIRCUIT FOR LINEAR ACTUATOR

[75] Inventors: Fumihiko Hara, Ohtsu; Shuji Hayashi, Mishima; Genjiro Yamada, Sakai, all of Japan

[73] Assignees: Tsubakimoto Chain Company; Kabushiki Kaisha Nikken, both of Japan

[21] Appl. No.: 253,198

[22] Filed: Oct. 4, 1988

[30] Foreign Application Priority Data

Dec. 2, 1987 [JP] Japan .................. 62-303203

[51] Int. Cl.⁵ ............................ B60Q 11/00
[52] U.S. Cl. .................. 318/490; 318/293; 116/28 R
[58] Field of Search .......... 318/280, 293, 460, 469, 318/490, 558, 565, 652; 116/28 R, 63 R; 246/12; 340/113, 443, 487

[56] References Cited

U.S. PATENT DOCUMENTS

| 3,198,907 | 8/1965 | Archer et al. | 318/469 X |
| 3,896,363 | 7/1975 | Kinsel et al. | 318/490 X |
| 3,905,435 | 9/1975 | Coronado | 116/28 R X |
| 3,909,691 | 9/1975 | Wilson et al. | 318/490 |
| 3,909,692 | 9/1975 | Jungel | 318/490 |
| 4,763,219 | 8/1988 | Nakamura . | |
| 4,766,413 | 8/1988 | Reavell | 116/28 R X |

Primary Examiner—Bentsu Ro
Attorney, Agent, or Firm—Howson and Howson

[57] ABSTRACT

A circuit for signaling an operator when a linear actuator, driven by a reversible direct current motor, has reached opposite end positions. Two normally closed series-connected switches which open at the respective positions and diodes, connected across each switch and to each other in opposition, stop the motor when the actuator reaches either position. A third switch and third diode cause a lamp to energize at one of the positions and remain energized until the actuator moves to the other position.

6 Claims, 5 Drawing Sheets

OPERATION CONFIRMATORY CIRCUIT FOR LINEAR ACTUATOR

FIELD OF INVENTION

This invention relates to an operation confirmatory circuit for a linear actuator, and more particularly to a circuit for verifying that an intended operation has been executed by a linear actuator capable of positioning an object by means of an electric motor.

BACKGROUND OF INVENTION

Linear actuators are used to transform rotation of a motor into linear motion of rod operating mechanisms such as gears, screw shafts, nuts, etc. For that purpose, a ball screw mechanism is commonly used.

Linear actuators usually require electrical switching in order to be operative. Unlike conventional mechanisms utilizing cables, links and the like, which encounter problems such as troublesome mounting and inoperativeness due to freezing or rust, linear actuators are especially preferred for manipulating devices such as valves, clutches, and engine throttles. However, since actuator positioning is performed by mechanical force, an operator is unable to "feel" whether or not the actual positioning took place. Therefore, it is necessary to provide some means for confirming that the operation has occurred. Many of the devices in the prior art are unreliable and provide false verifications.

SUMMARY OF INVENTION

The present invention solves the above-mentioned problem with an operation confirmatory circuit which signals an operator when an operating rod, linearly driven by an electric motor, has reached either of its end positions. The circuit includes first and second switches connected in series with first and second diodes connected across each switch and connected to each other in opposition. The first switch opens when the rod is near one end position, and the second switch opens when the rod is near the other end position. A lamp, in series with a third switch which is connected in parallel with a third diode, permits electric current to energize the lamp when the rod moves to the one end position.

To restore the operating rod to the other position, the polarity of the electric current is reversed and rotation of the motor changed. The electric current now flows through the first diode around the first switch. Consequently, the lamp will continue to be lit.

The rod continues to advance in the opposite direction, and when it has moved a predetermined distance, the second switch opens, causing the lamp to be extinguished. As a result, the operator is notified that the rod has been restored to the original condition.

As described above, the lamp is lit as the rod approaches the one end position but it will remain lit after the rod begins to leave the one end position. It is extinguished only after the rod has moved the predetermined distance.

Other novel features and advantages of the invention will become more apparent from the following detailed description when considered in conjunction with the accompanying drawings wherein:

DESCRIPTION OF THE PREFERRED EMBODIMENTS

Figure 1:
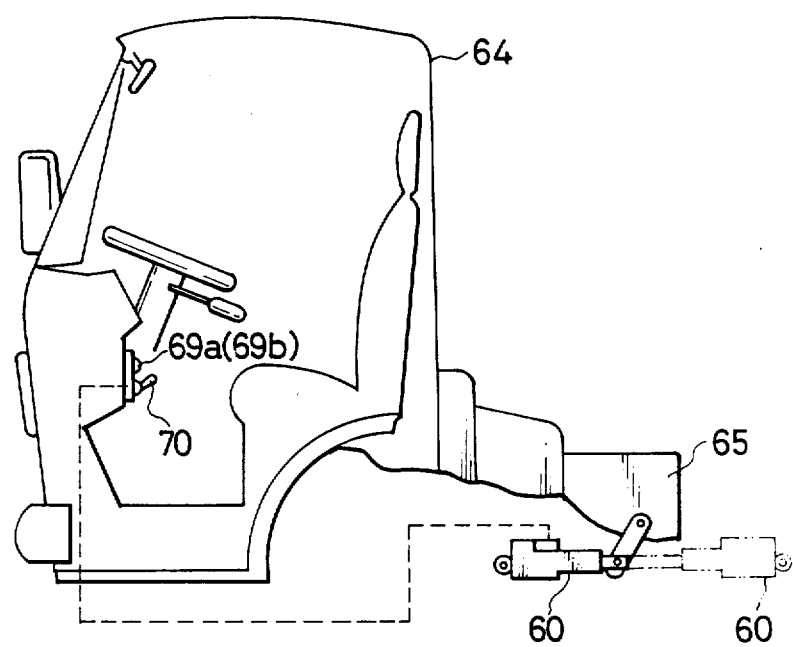
FIG. 1 diagrammatically shows how a linear actuator of the prior art is applied in an automotive body.

Referring now to the drawings wherein like characters designate like or corresponding parts throughout the several views, there is shown in FIG. 1 a conventional linear actuator 60, in solid outline, mounted on an automotive body 64 for operating a change-over or transfer mechanism 65 such as a clutch or gear train.

Figure 2:
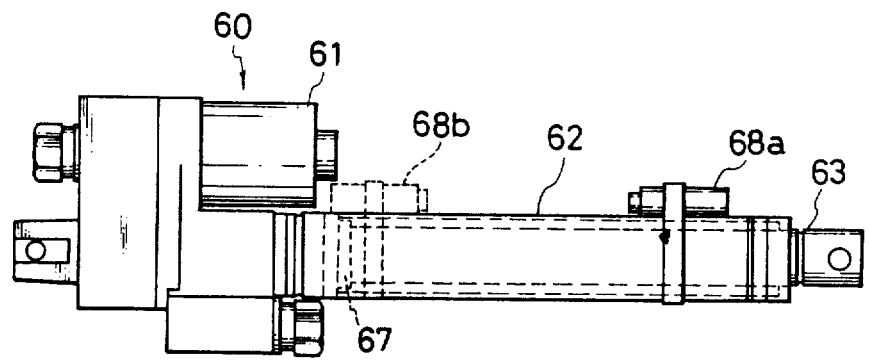
FIG. 2 is an elevation of the linear actuator of FIG. 1.
Figure 3:
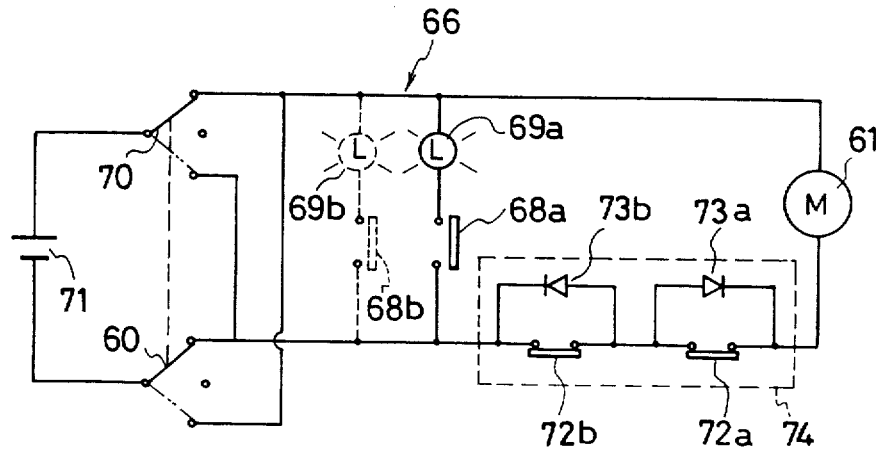
FIG. 3 is a prior art circuit as applied to the linear actuator in FIG. 2.

Referring to FIGS. 2 and 3, actuator 60 is controlled by an electrical circuit 66 which includes a pair of reed switches 68a, 68b at the both ends of a cylinder 62 operated by a magnet 67 mounted on the rod 63, and confirmation lamps 69a, 69b near the operator (driver) in body 64. With switch 70 in the position shown in FIG. 3, power is supplied of one polarity to motor 61 to drive rod 63 to the right in FIG. 2. When the rod 63 reaches the right end, thus achieving the change-over of the mechanism 65, magnet 67 closes the reed switch 68a to light the lamp 69a notifying the operator that the change-over of mechanism 65 has occurred.

To restore the mechanism 65 to its original condition, switch 70 is switched reversing the polarity of the current to the motor 61 causing it to rotate in the reverse direction so that the rod 63 retracts. Lamp 69a will be extinguished as result of a minimal backward movement of the rod 63 even though mechanism 65 has not been fully restored to its original condition. No indication is given to the operator that mechanism 65 has reached its original condition. Consequently, the operator prematurely stop the linear actuator 60.

If it is desired that switching-over be performed at the position where the rod 63 is fully retracted within the cylinder 62 instead of extended, the linear actuator 60 is modified as shown by the dotted line in FIGS. 1, 2 and 3 with a reed switch 68b and a lamp 69b utilized instead of switch 68a and lamp 69a. In this case as well, there is a likelihood of misleading indication of the lamp as explained above.

Therefore, the conventional confirmatory circuit 66 has a drawback that it may give a misleading indication about the state of the mechanism to be operated by means of a linear actuator.

The above-mentioned problem may be solved if all of the reed switches 68a, 68b and the lamps 69a, 69b are used simultaneously; namely, one pair for detecting the previous position and the other pair for detecting the switch-over action. However, such a structure renders the whole circuit complicated, requiring a greater number of component parts.

Incidentally, automatic-return switches 72a, 72b and two diodes 73a, 73b in FIG. 3 constitute an automatic stop circuit 74 for automatically stopping the motor 61 by detecting over-load working on the rod 63 at the both end positions.

Figure 5:
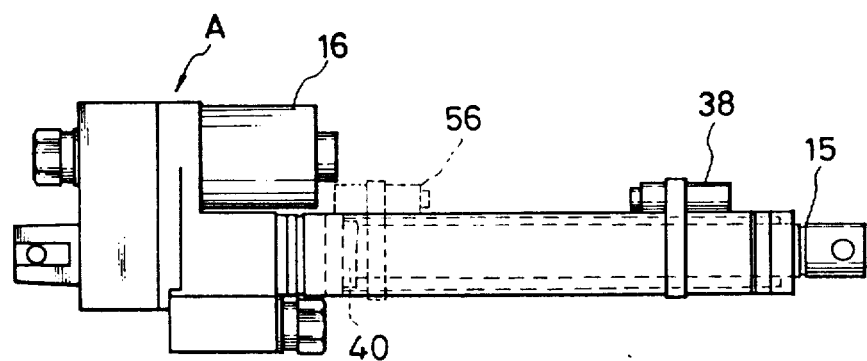
FIG. 5 is an elevation of the linear actuator of FIG. 4.

Referring now to FIG. 5, a linear actuator A according to the invention includes an operating rod 15 which is linearly moved by means of an electric motor 16. The rod 15 is adapted to automatically stop when it reaches the forward and rear end positions as well as when an over-load is detected.

Figure 6:
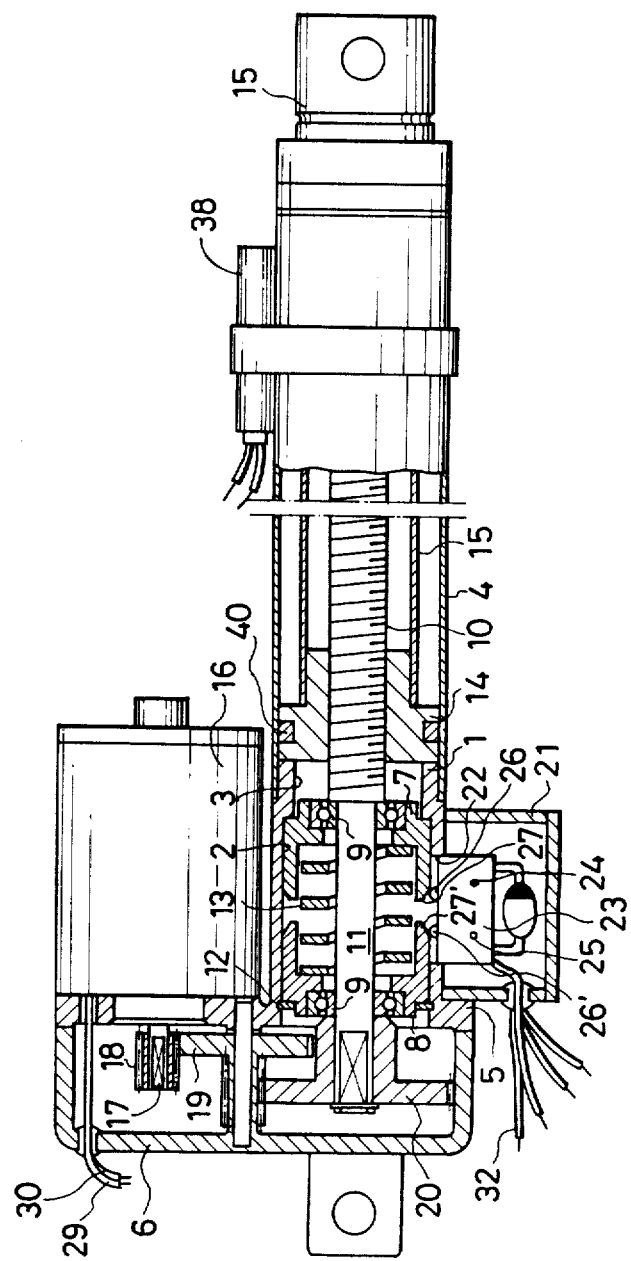
FIG. 6 is a partial section of the linear actuator of FIG. 5.

The driving mechanism as shown in FIG. 6 will be first described. Within a cylindrical body 1, a cylindrical larger bore 2 and a smaller bore 3 are coaxially provided; and in the forward position an outer cylinder 4 is mounted; and in the rear position, a cover 6 is secured to a flange 5. Within the larger bore 2, two cup-shaped spring receivers 7, 8 are slidably inserted in a face-to-face relationship; and at the bottom portions of each of said cup shapes, bearings 9, 9 are provided to support the distal end 11 of a screw shaft 10. Between the spring receivers 7, 8, a compression coil spring 13 is held with a predetermined pre-loading such that the front receiver 7 abuts against a stepped portion of the bore 3, and the rear receiver 8 abuts against a stop ring 12.

A nut 14 is threadedly engaged with the screw shaft 10, to which the operating rod 15 is secured. The rod 15 is connected to a mechanism such as mechanism 65 in FIG. 1 and is prevented from rotating with screw shaft 15. The distal end 11 and the output shaft 17 of the motor 16 are connected by a gear train 18, 19 and 20. A switch box 23 within a case 21 is fixed at an aperture 22 in the body 1 and contains automatic-return type switches 24, 25. Respective operating members 26, 26' of said switches normally project upward to operate the respective switches when pushed downward by the tapered surfaces 27, 27' at the opposing ends of the spring receivers 7, 8. Lead wires 29 and 30 connect to motor 16, and wires 31, 32 to power supply lines.

Figure 4:
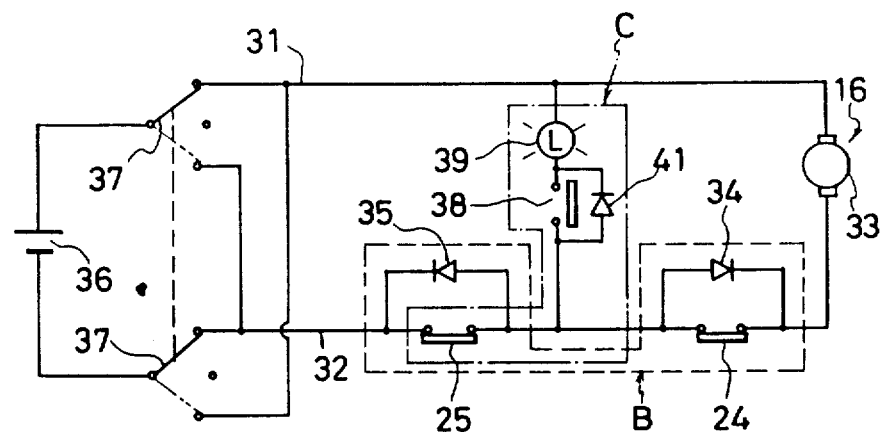
FIG. 4 is a circuit of one embodiment of a linear actuator according to the present invention.

Referring to FIG. 4, an automatic stop circuit B of the operating rod is provided which includes switches 24, 25 connected in series with an armature 33 of the motor 16. Diodes 34, 35 are each connected across the respective switches 24, 25 in anode-to-anode opposition. A change-over switch 37 is connected to a direct current power source 36 to change the polarity thereof.

An operation confirmatory circuit C is also provided which includes a lamp 39 and a reed switch 38 connected in series with one of the switches 37 and a point between the two switches 24, 25. The reed switch 38 is proximate to the forward end of the cylinder 4 and is closed or opened by means of a magnet 40 provided on the nut 14. The switch 38 is adapted to latch closed after the rod 15 has fully reached the end position. A diode 41 is connected across the switch 38 with its anode connected in opposition to the anodes of the switches 24, 25.

The circuits B and C function as follows. When power is supplied to the armature 33 with the line 31 on the positive side, the rod 15 moves to the right in FIG. 6. As the rod 15 reaches the righthand end position, a thrust load received by the rod 15 is transmitted to the spring 13 through the spring receiver 7. When the load exceeds a predetermined pre-load of the spring 13, the spring receiver 7 is urged to the left in FIG. 6 and tapered surface 27 of the spring receiver 7 pushes the operating member 26 downward to open the switch 24. Consequently, the motor 16 and rod 15 stop as the power is disconnected. At that state, since the nut 14 cannot retract with the pressure of the spring 13, the switch 24 remains open.

As described above, when the rod 15 advances until it reaches the forward end position, the magnet 40 also advances along with the rod 15 and closes the reed switch 38 to light the lamp 39. Thus, the operator is informed when the change-over of the mechanism 65 has been achieved.

To restore mechanism 65 to its original position, it is necessary to change the switch 37 so that the wire 31 is of negative polarity. Then, an electric current can flow through the diode 34 and the motor 16 can rotate in the reverse direction. As the rod 15 retracts, the spring receiver 7 advances to the original position due to the pressure of the spring 13, and the operating member 26 automatically returns to the original condition. As a result, the switch 24 is closed. While the rod 15 retracts, the magnet 40 recedes from the reed switch 38, so that the switch 38 is opened. However, an electric current may continue to flow through the diode 41 and maintain the lamp 39 lit. While the rod 15 retracts, the mechanism 65 is restored to its original position.

When the rod 15 reaches the backward end position, over-load acts upon the screw shaft 10. The spring receiver 8 advances such that the tapered surface 27' pushes the operating member 26' downward, causing the switch 25 to open and stop the motor 16. Simultaneously, as an electric current is removed, the lamp 39 is extinguished. Thus, the operator is informed when the mechanism 65 has been restored to the original position.

In the above-described embodiment, a first change-over is effected when the rod 15 reaches the forward end position; namely, in the pushing direction of the rod 15. However, the embodiment in FIG. 7 effects the first change-over when the rod 15 reaches the backward end position; namely, in the pulling direction of the rod 15.

Figure 7:
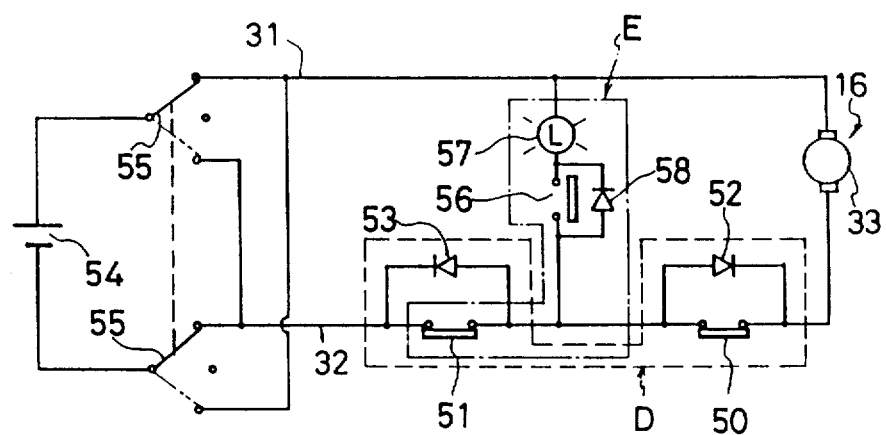
FIG. 7 is a circuit of another embodiment according to the invention.

Referring to FIG. 7, an automatic stop circuit D is provided which includes automatic-return type switches 50, 51 connected in series with the armature 33 of the motor 16. Diodes 52, 53 are each connected across the respective switches 50, 51 in cathode-to-cathode opposition. A switch 55 is connected to a power source 54 so that the polarity of the power may be changed.

The operation confirmatory circuit E is similar to the embodiment of FIG. 4. A reed switch 56, a lamp 57 and a diode 58 are connected in series with the switch 55 and at a point between the switches 50, 51. The switch 56, which is located proximate to the rearward end position of the rod 15, as shown by the phantom line in FIG. 5, is opened and closed by the magnet 40 on the nut 14.

The embodiment of FIG. 7 functions as follows. When power is supplied to the armature 33 with the line 31 on the negative side, the rod 15 moves to the left in FIG. 6. As the rod 15 reaches the left end position, a thrust load received by the rod 15 is transmitted to the spring 13 through the spring receiver 7; and when the load exceeds a pre-determined pre-load of the spring 13, the spring receiver 8 moves to the right in FIG. 6 and causes the tapered surface 27' of the spring receiver 8 to push the operating member 26' downward to open the switch 50. Consequently, the motor 16, and the rod 15 stop as the power is disconnected. In that state, the nut 14 cannot retract with the pressure of the spring 13 and the switch 50 remains open.

As described above, when the rod 15 retracts to the rearward end position, the magnet 40 also moves along with the rod 15 and closes the reed switch 56 and the lamp 57 is lit. Thus, the operator is informed when the change-over of the mechanism 65 has been achieved.

To restore the mechanism to the original condition, it is necessary to change the switch 55 so that the line 31 becomes positive. Then, an electric current can flow through the diode 52 and rotate the motor 16 in the reverse direction. As the rod 15 advances, the spring receiver 8 moves to the original position due to the pressure of the spring 13, and the operating member 26' automatically returns to the original condition. As a result, the switch 50 is closed. While the rod 15 advances, the magnet 40 recedes from the switch 56, so that the switch 56 is opened. However, an electric current continues to flow to the lamp 57 by way of the diode 58; and consequently, the lamp 57 remains lit. While the rod 15 retracts, the mechanism 65 is restored to the original condition.

When the rod 15 reaches the forward end position, over-load will act upon the screw shaft 10 advancing the spring receiver 7 such that the tapered surface 27 pushes the operating member 26 downward to open the switch 51. As a result, the motor 16 stops. Simultaneously, as electric current is cut, the lamp 57 is extinguished. Thus, the operator is informed when the mechanism 65 has been restored to the original condition.

There is no likelihood of misinterpreting the state of the mechanism to be operated. According to the aforementioned embodiments, either of the lamps 39 and 57 may be lit when the rod has reached the forward or rearward end position; however, it is not put out immediately when the rod starts to move in the opposite direction. The lamp is put out only when the rod has reached the opposite end position. This means that when a first switch-over of a mechanism is to be effected, the lamp is lit almost simultaneously with the switch-over action. When the restoration to the original condition is to be effected, the lamp is put out when the rod has reached the opposite end position after restoring the mechanism 65 to its original condition.

In addition, since the confirmatory circuit also functions as an automatic stop circuit, the whole circuit may be simple, requiring a smaller number of component parts.

Obviously, many modifications and variations of the present invention are possible in light of the above teachings. It is therefore to be understood that within the scope of the appended claims the invention may be practiced otherwise than as specifically described.

What is claimed is:

1. An operation confirmatory circuit for a linear actuator having an operating rod operable between opposite first and second end positions by a reversible electric motor comprising:
    a first switch normally closed when said operating rod is located near the first end position;
    a second switch normally closed when said operating rod is located at the second end position;
    a confirmation lamp connected in a series with said first and second switches; and
    a diode connected in parallel with said first switch and adapted to permit electric current to flow therethrough when the rod moves in the opposite direction from said first end position as a result of reverse rotation of said motor.

2. The circuit according to claim 1 wherein: said first end position is in an extending direction of the rod.

3. The circuit according to claim 1 wherein: said first end position is in a retracting direction of the rod.

4. A circuit for signaling an operator when a linear actuator has reach either of opposite first and second end positions, the linear actuator being driven by an electric motor and direct current power supply each having two terminals respectively connected through a polarity switch for reversing the direction of rotation of the motor, comprising, in combination:
    first and second switches each normally closed and formed to be connected in series between one terminal of each of the motor and the polarity switch, said first and second switches operatively connected to the actuator for opening near the respective first and second end positions;
    first and second diodes respectively connected in parallel with said first and second switches and in opposition to each other;
    a third switch normally open and operatively connected to said actuator for closing near the first end position;
    signal means connected in series with said third switch between the other terminal of each of the motor and the polarity switch and the junction of said first and second switches; and
    a third diode connected in parallel with said third switch and in opposition to said first and second diodes.

5. An operation confirmatory circuit for a linear actuator driven by a reversible electric motor, comprising, in combination:
    first means including a switch connected to said motor for selectively driving the actuator to either a first or a second position;
    second means responsive to actuator movement and operatively connected to said switch for providing a continuous signal after the first position is reached, said second means includes a normally open switch connected in series with a lamp and in parallel with a diode; and
    third means responsive to actuator movement and operatively connected to said switch for extinguishing the signal after the second position is reached, said third means includes a pair of normally closed switches connected in series and a pair of diodes connected in parallel with respective ones of said pair of switches and in opposition to each other.

6. An operation confirmatory circuit for an electric motor-driven actuator comprising, in combination:
    means providing electric current, said electric current-providing means having first and second terminals and switching means for reversing the polarity of the current at said terminals;
    electric motor means for reversibly driving the actuator in a first direction from a first position to a second position, and in a second direction from said second position to said first position; and
    signalling means, responsive to actuator movement, for providing a first continuous signal when the second position is reached following movement of the actuator in said first direction, maintaining said continuous signal while the actuator is moving in said second direction, and extinguishing said signal when said first position is reached following movement of the actuator in said second direction;
    wherein the signalling means comprises first and second limit switches connected in series with each other and with said electric motor means and said current-providing means; said limit switches are responsive to actuator movement so that one of said limit switches is opened when the second position is reached, the other of said limit switches is opened when the first position is reached, and the switches are otherwise closed; one of said limit switches is connected directly to said first terminal of the electric current-providing means, and said limit switches are connected directly to each other at a junction;

wherein the signalling means further comprises a signal-producing means and a third limit switch responsive to actuator movement; said signal-producing means and said third limit switch being connected in series with each other between said junction and said second terminal of said electric current-providing means; said third limit switch being closed when said first position is reached and being otherwise open;

wherein the signalling means further comprises two diodes connected respectively in parallel with said first and second limit switches and in opposition to each other; and wherein the signalling means further comprises a third diode connected in parallel with said third limit switch, said third diode being connected in opposition to each of said two diodes.

* * * * *